United States Patent
Shoji (10) Patent No.: US 6,344,652 B1
(45) Date of Patent: Feb. 5, 2002

(54) RADIATION DETECTING CASSETTE

(75) Inventor: Takashi Shoji, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/481,416

(22) Filed: Jan. 12, 2000

(30) Foreign Application Priority Data

| Jan. 13, 1999 | (JP) | 11-006170 |
| Feb. 1, 1999 | (JP) | 11-023792 |
| Dec. 6, 1999 | (JP) | 11-346708 |

(51) Int. Cl.$^7$ ............................................. G01T 1/24
(52) U.S. Cl. .................. 250/370.09; 250/580; 378/189; 378/98.5; 378/98.8
(58) Field of Search ............................ 250/370.09, 580, 250/370.08; 378/189, 182, 183, 98, 98.5, 98.8

(56) References Cited

U.S. PATENT DOCUMENTS

| 4,803,359 A | | 2/1989 | Hosoi et al. | |
| 5,187,369 A | | 2/1993 | Kingsley et al. | |
| 5,661,309 A | | 8/1997 | Jeromin et al. | |
| 5,773,832 A | * | 6/1998 | Sayed et al. | 250/370.09 |
| 5,828,726 A | * | 10/1998 | Polichar et al. | 378/98.2 |
| 5,844,961 A | * | 12/1998 | McEvoy et al. | 378/98.8 |
| 5,877,501 A | * | 3/1999 | Ivan et al. | 250/370.09 |
| 5,920,070 A | * | 7/1999 | Petrick et al. | 250/370.09 |
| 6,047,257 A | * | 4/2000 | Dewaele | 704/270 |

FOREIGN PATENT DOCUMENTS

| JP | 59-211263 | | 11/1984 | |
| JP | 1-216290 | | 8/1989 | |
| JP | 1-259839 | * | 10/1989 | G03B/42/04 |
| JP | 2-164067 | | 6/1990 | |
| JP | 7-140255 | | 6/1995 | |
| JP | 10-232824 | | 9/1998 | |
| JP | 10-271374 | | 10/1998 | |
| WO | 92/06501 | | 4/1992 | |

OTHER PUBLICATIONS

L.E. Antonuy et al, Signal, noise, and readout considerations in the development of amorphous silicon photodiode arrays for radiotherapy and diagnostic x-ray imaging, 1991, p. 108–119, SPIE vol. 1443, Medical Imaging V; Iage Physics.

S. Qureshi et al, Material Parameters in Thick Hydrogenated Amorphous Silicon Radiation Detectors, Lawrence Berkeley Laboratory, University of California, p. 1–4.

Yujiro Naruse et al, Metal/Amorphous Silicon Multilayer Radiation Detectors, Apr. 1989, IEE Transactions on Nuclear Science, vol. 36, No. 2.

* cited by examiner

*Primary Examiner*—Constantine Hannaher
*Assistant Examiner*—Albert Gagliardi
(74) *Attorney, Agent, or Firm*—Sughrue Mion, PLLC

(57) ABSTRACT

A radiation detecting cassette comprises a radiation detector and a flat-shaped case housing for accommodating the radiation detector. The radiation detector is provided with a plurality of solid-state detecting devices, which are arrayed in a two-dimensional form and which detect radiation carrying image information of an object and convert the radiation into an image signal representing a radiation image of the object. The radiation detector further comprises a receiving device for receiving necessary information from the exterior in cases where an image recording operation is to be performed, and a display device for displaying the information having been received by the receiving device. The radiation detecting cassette enables an image recording menu, such as image recording conditions to be used, an image recording method to be used, and a portion of an object, the image of which is to be recorded, to be found at an image recording site in cases where a radiation image of a patient is to be recorded.

19 Claims, 3 Drawing Sheets

RADIATION DETECTING CASSETTE

BACKGROUND OF THE INVENTION

1. Field of the Invention

This invention relates to a radiation detecting cassette, which accommodates a radiation detector.

2. Description of the Prior Art

Techniques for performing radiation image recording and read-out operations by utilizing radiation detecting cassettes, which accommodate radiation detectors, have heretofore been used in practice. With the techniques, radiation is irradiated to an object, such as a living body, and the radiation carrying image information of the object is detected with the radiation detector accommodated in the radiation detecting cassette.

The radiation detecting cassettes are disclosed in, for example, Japanese Unexamined Patent Publication No. 7(1995)-140255 and U.S. Pat. No. 5,661,309. With the disclosed radiation detecting cassettes, the radiation carrying image information of the object is converted by a scintillator into visible light having an intensity in accordance with the intensity of the radiation. The visible light is photoelectrically converted into an image signal by solid-state detecting devices, which constitute the radiation detector and are arrayed in a two-dimensional form. The thus obtained image signal is stored in an image memory. Thereafter, the image signal is fed from the image memory into a signal processing unit, which is located at the exterior of the radiation detecting cassette. The image signal having been obtained from the signal processing unit is utilized for reproducing the radiation image of the object as a visible image.

As an example of a radiation detector having no scintillator and directly detecting radiation, a solid-state radiation detector utilizing a semiconductor, such as CdTe, has been proposed in, for example, Japanese Unexamined Patent Publication No. 1(1989)-216290. As another example of a radiation detector having no scintillator, a solid-state radiation detector comprising two or more layers overlaid via a metal plate with respect to the direction along which radiation is transmitted has been proposed in, for example, "Metal/Amorphous Silicon Multilayer Radiation Detectors," IEE TRANSACTIONS ON NUCLEAR SCIENCE, Vol. 36, No. 2, April 1989. In the direct conversion types of solid-state radiation detectors, a capacitor is connected to each of charge collecting electrodes, and electric charges having been collected by each charge collecting electrode are accumulated at the corresponding capacitor as latent image charges carrying image information.

Operations for recording radiation images of patients (objects) are controlled from a console of an image recording apparatus, which is located at a predetermined site in an image recording room. When a radiation image of a patient is to be recorded, an image recording card, on which instructions of a medical doctor have been written, is carried by the patient to the console, or the instructions of the medical doctor are transferred through a network to the console. A radiation engineer at the console investigates the instructions written on the image recording card or the instructions displayed on the console and thereby obtains information necessary for the image recording operation, such as identification (ID) information, information concerning an image recording method to be used, and information concerning a portion of the object, the image of which is to be recorded. In accordance with the obtained information, the radiation engineer sets image recording conditions from the console, locates a radiation detecting cassette at the position for the recording of the image of the portion of the object, and performs the image recording operation. With respect to the same patient, a plurality of images are often recorded successively with different image recording methods and/or for different portions of the object. In such cases, each time one image is recorded, the radiation engineer makes reference to the instructions of the medical doctor, sets the image recording conditions to be used, and locates the radiation detecting cassette at a predetermined position.

As described above, heretofore, it has been necessary that, after confirming the portion of the object, the image of which is to be recorded, and the like, at the console, or the like, the radiation engineer goes to the image recording site and locates the radiation detecting cassette at a predetermined position. Particularly, in cases where a plurality of images are to be recorded successively with different image recording methods and/or for different portions of the object, each time one image is recorded, the radiation engineer must confirm the portion of the object, the image of which is to be recorded, the order in which the images are to be recorded, and the like, at the console, or the like, and must locate the radiation detecting cassette at a predetermined position at the image recording site. Therefore, considerable time and labor are required to perform the image recording operations. Also, the image recording conditions vary for different portions of the object, the images of which are recorded, and therefore preparations in accordance with the image recording conditions must be made. For example, it is often necessary that a grid is replaced by a grid of a pitch appropriate for the portion of the object, the image of which is to be recorded.

Further, in order to confirm whether the patient being present at the image recording site is or is not the patient, whose image is to be recorded, it has heretofore been necessary for the radiation engineer to investigate the information on the image recording card or the console and to inquire of the patient being present at the image recording site. Considerable time and labor are required to make such confirmation.

SUMMARY OF THE INVENTION

The primary object of the present invention is to provide a radiation detecting cassette, which enables an image recording menu, such as image recording conditions to be used, an image recording method to be used, and a portion of an object, the image of which is to be recorded, to be found at an image recording site in cases where a radiation image of a patient is to be recorded.

Another object of the present invention is to provide a radiation detecting cassette, which enables identification (ID) information, such as the name of a patient, to be found at an image recording site.

A further object of the present invention is to provide a radiation detecting cassette, wherein an image processing method and parameters are capable of being set from the cassette side, or a transfer destination of an image signal, the order, in which image signals are to be transferred, and the like, are capable of being specified from the cassette side.

The present invention provides a first radiation detecting cassette, comprising:

i) a radiation detector provided with a plurality of solid-state detecting devices, which are arrayed in a two-dimensional form and which detect radiation carrying image information of an object and convert the radiation into an image signal representing a radiation image of the object, and ii) a flat-shaped case housing for accommodating the radiation detector, wherein the improvement comprises the provision of:

receiving means for receiving necessary information from the exterior (i.e., a console) in cases where an image recording operation is to be performed, and displaying means for displaying the information having been received by the receiving means.

In the first radiation detecting cassette in accordance with the present invention, with the displaying means, an image recording menu, which is to be used, or the like, is displayed on the radiation detecting cassette when the image recording operation is to be performed.

Also, in the first radiation detecting cassette in accordance with the present invention, the displaying means may be located on a surface of the case housing, which surface is on the side opposite to the surface exposed to radiation.

The receiving means may be provided with a terminal, a circuit, a connector, an antenna, and the like, for receiving a signal sent from the exterior through cable communication or radio communication.

The present invention also provides a second radiation detecting cassette, comprising:

i) a solid-state radiation detector for detecting radiation, which carries image information, and feeding out an image signal representing a radiation image, and ii) a case housing for accommodating the solid-state radiation detector, wherein the improvement comprises the provision of an operation panel for setting details of processing of the image signal.

The second radiation detecting cassette in accordance with the present invention should preferably further comprise image processing means for performing the processing of the image signal. The second radiation detecting cassette in accordance with the present invention should more preferably further comprise displaying means for displaying an image represented by a processed image signal, which has been obtained from the processing performed on the image signal and in accordance with details of operations performed from the operation panel.

The term "processing of an image signal" as used herein means the image processing. The image processing may be one of various kinds of processings, which are performed on the image signal fed out from the solid-state radiation detector. For example, the image processing may be pixel density transformation processing, predetermined normalization processing (i.e., exposure data recognizer (EDR) processing), image size enlargement or reduction processing, dynamic range compression processing, image signal compression processing, image feed processing for image confirmation, or the like. In order for the image processing to be performed, ordinarily, it is necessary that the analog image signal having been fed out from the radiation detector is converted into a digital image signal. For such purposes, ordinarily, an analog-to-digital converter is utilized.

The term "details of processing of an image signal" as used herein means the kind of the image processing, the technique for the image processing, parameters for the image processing, and the like.

The present invention further provides a third radiation detecting cassette, comprising:

i) a solid-state radiation detector for detecting radiation, which carries image information, and feeding out an image signal representing a radiation image, and ii) a case housing for accommodating the solid-state radiation detector, wherein the improvement comprises the provision of an operation panel for setting details of processing concerning transfer of the image signal.

The term "details of processing concerning transfer of an image signal" as used herein means, for example, the order, in which the image signals are to be transferred, (including alteration of the order, in which the image signals are to be transferred) and the transfer destination. The alteration of the order, in which the image signals are to be transferred, may be performed with one of various methods. For example, the order, in which the image signals are to be transferred, may be altered by rearranging addresses of the image signals, which have been stored in a memory, such that the order, in which the image signals are read from the memory, may be altered, and transferring the image signals in the order, in which they are read from the memory. Alternatively, the order, in which the image signals are to be transferred, may be altered after the image signals have been read from the memory.

The third radiation detecting cassette in accordance with the present invention should preferably further comprise transfer means for transferring the image signal to a transfer destination, which has been set from the operation panel. The transfer means may be one of various kinds of means, which can transfer the image signal to the transfer destination having been set. Also, the transfer means may be of the cable communication type or the radio communication type.

The present invention still further provides a fourth radiation detecting cassette, comprising:

i) a solid-state radiation detector for detecting radiation, which carries image information, and feeding out an image signal representing a radiation image, and ii) a case housing for accommodating the solid-state radiation detector, wherein the improvement comprises the provision of an operation panel for setting details of processing of subsidiary information giving specifics about the image signal.

The fourth radiation detecting cassette in accordance with the present invention should preferably further comprise processing means for performing processing of the subsidiary information giving specifics about the image signal.

The term "subsidiary information giving specifics about an image signal" as used herein means the information concerning the object image, which is represented by the image signal, and the information representing an opinion given by the radiation engineer, who makes a diagnosis in accordance with the image signal. Examples of the information concerning the object image, which is represented by the image signal, include the name of the patient, the sex of the patient, the portion of the object, the image of which is recorded, the image recording method used, and the image processing conditions (such as the technique for the image processing, and parameters for the image processing).

The term "details of processing of subsidiary information giving specifics about an image signal" as used herein means one of various kinds of processings concerning the subsidiary information. For example, the details of processing of subsidiary information giving specifics about the image signal may include the processing for setting the image processing parameters, which have been set in accordance with the image recording method used and the image processing conditions, as the subsidiary information appended to the image signal, the processing for forming a signal representing the opinion concerning the image represented by the image signal, or the like, and setting the signal as the subsidiary information appended to the image signal, the kind of the processing, and the technique for the processing.

The present invention also provides a fifth radiation detecting cassette, comprising:

i) a solid-state radiation detector for detecting radiation, which carries image information, and feeding out an image signal representing a radiation image, and     ii) a case housing for accommodating the solid-state radiation detector, wherein the improvement comprises the provision of an operation panel for setting details of processing concerning transfer of subsidiary information giving specifics about the image signal.

The fifth radiation detecting cassette in accordance with the present invention should preferably further comprise transfer means for transferring the subsidiary information giving specifics about the image signal to a transfer destination, which has been set from the operation panel. The transfer means may be one of various kinds of means, which can transfer the subsidiary information to the transfer destination having been set. Also, the transfer means may be of the cable communication type or the radio communication type.

Each of the second, third, fourth, and fifth radiation detecting cassettes in accordance with the present invention should preferably further comprise displaying means for displaying details of operations performed from the operation panel.

The displaying means for displaying details of operations performed from the operation panel should preferably be located on a surface of the case housing, which surface is on the side opposite to a detection surface of the case housing, and should more preferably be located on an outer surface of the case housing. Also, the displaying means, which is provided in the aforesaid second radiation detecting cassette in accordance with the present invention and which displays the image represented by the processed image signal having been obtained from the processing performed on the image signal and in accordance with details of operations performed from the operation panel, should preferably be located on a surface of the case housing, which surface is on the side opposite to a detection surface of the case housing, and should more preferably be located on an outer surface of the case housing. As the displaying means, flat plate-like displaying means, such as a liquid crystal panel, an electroluminescent (EL) panel, or a plasma display panel (PDP), should preferably be employed.

Further, in each of the second, third, fourth, and fifth radiation detecting cassettes in accordance with the present invention, the operation panel should preferably be located on a surface of the case housing, which surface is on the side opposite to a detection surface of the case housing, and should more preferably be located on an outer surface of the case housing.

The term "details of operations" as used herein means the details of operations with keys, and the like, on the operation panel. For example, the details of operations include the states and procedures of operations for the setting of details of processing of the image signal or details of processing of subsidiary information giving specifics about the image signal, and the states and procedures of operations for the setting of details of processing concerning transfer of the image signal or details of processing concerning transfer of subsidiary information giving specifics about the image signal. The procedures of operations may represent the details of the setting which is to be performed (i.e., the details of the setting to be employed as a candidate). Alternatively, the procedures of operations may represent the details of the setting which has already been performed.

The displaying of the details of operations may be performed with one of various displaying techniques. For example, several kinds of image recording menus to be employed as candidates may be displayed. Alternatively, the processing method, the parameters, the order in which the image signals are to be transferred, and the transfer destination corresponding to a menu, which has been selected from the displayed image recording menus, may be displayed automatically. As another alternative, the processing method, parameters, and the like, which should be employed as the candidate, may be displayed. As a further alternative, the processing method, parameters, and the like, may be inputted with the keys, and the details of the inputting operations may be displayed.

The term "detection surface of a case housing" as used herein means the surface, which is on the side exposed to the recording radiation carrying the image information and which is on the side facing the detection surface of the solid-state radiation detector accommodated in the case housing. Also, as described above, the operation panel should more preferably be located on an outer surface of the case housing. Specifically, it is sufficient for the operation panel to be located such that an operating section of the operation panel may be located at the outer surface of the case housing so as to be capable of being operated without the case housing being opened. The entire operation panel need not necessarily be located on the outer surface of the case housing.

The operation panel may be one of various types of operation panels, with which the details of various kinds of processings described above can be set. The operation panel is not limited to the flat plate-like panel. Also, the operation panel may be of the cursor movement type, the key input type, or the like.

The solid-state radiation detector is the detector, which detects radiation carrying image information of the object and feeds out the image signal representing a radiation image of the object. The solid-state radiation detector converts the incident radiation into electric charges directly or after converting the radiation into light, accumulates the electric charges at charge accumulating sections, and thereafter feeds out the electric charges to the exterior. In this manner, the image signal representing the radiation image of the object can be obtained.

The solid-state radiation detector may be one of various types. For example, from the aspect of a charge forming process for converting the radiation into electric charges, the solid-state radiation detectors may be classified into photo conversion types of solid-state radiation detectors and direct conversion types of solid-state radiation detectors.

With the photo conversion types of solid-state radiation detectors, the fluorescence, which is produced by a fluorescent material when it is exposed to radiation carrying image information, is detected by photoelectric conversion devices, and the thus obtained electric charges are accumulated at charge accumulating sections of the photoelectric conversion devices. The accumulated electric charges are then converted into an image signal (i.e., an electric signal), and the image signal is fed out. The photo conversion types of solid-state radiation detectors are described in, for example, Japanese Unexamined Patent Publication Nos. 59(1984)-211263 and 2(1990)-164067, PCT International Publication No. WO92/06501, and SPIE Vol. 1443, Medical Imaging V; Image Physics (1991), pp. 108–119.

With the direct conversion types of solid-state radiation detectors, electric charges, which are generated in a radioconductive material when it is exposed to radiation carrying image information, are collected by charge collecting electrodes and accumulated at charge accumulating sections. The accumulated charges are then converted into an electric signal, and the electric signal is fed out. The direct conversion types of solid-state radiation detectors are described in, for example, "Material Parameters in Thick Hydrogenated Amorphous Silicon Radiation Detectors," Lawrence Berkeley Laboratory, University of California, Berkeley, Calif. 94720 Xerox Parc. Palo Alto. Calif. 94304; "Metal/Amorphous Silicon Multilayer Radiation Detectors, IEE TRANSACTIONS ON NUCLEAR SCIENCE, Vol. 36, No. 2, April 1989; and Japanese Unexamined Patent Publication No. 1(1989)-216290.

Also, from the aspect of a charge reading process for reading the accumulated electric charges to the exterior, the solid-state radiation detectors may be classified into, for example, thin-film transistor (TFT) reading types of solid-state radiation detectors, wherein TFT's, each of which is connected to one of the charge accumulating sections, are operated successively in order to read the accumulated electric charges, photo reading types of solid-state radiation detectors, wherein the accumulated electric charges are read by irradiating reading light (an electromagnetic wave for the reading) to the solid-state radiation detectors, and improved direct conversion types of solid-state radiation detectors, which utilize a combination of the direct conversion types of techniques and the photo reading types of techniques. The improved direct conversion types of solid-state radiation detectors have been proposed by the applicant in Japanese Patent Application Nos. 10(1998)-232824 and 10(1998)-271374. The radiation detecting cassettes in accordance with the present invention may comprise one of various types of solid-state radiation detectors and the case housing, which accommodates the solid-state radiation detector.

The first radiation detecting cassette in accordance with the present invention comprises the receiving means for receiving necessary information from the exterior in cases where an image recording operation is to be performed, and the displaying means for displaying the information having been received by the receiving means. Therefore, with the first radiation detecting cassette in accordance with the present invention, in cases where the image recording operation is to be performed, the information, such as an image recording menu, which is necessary for the recording of the radiation image of the object, can be found at the image recording site, and it is not necessary for the radiation engineer to return from the image recording site to the console for confirming the necessary information. Accordingly, the image recording operation can be performed efficiently and accurately. The first radiation detecting cassette in accordance with the present invention is effective particularly in cases where the object is a child and the radiation engineer must perform the image recording operation while the radiation engineer is being in constant attendance upon the child for holding the child such that the child may not move during the image recording operation. Also, in cases where images of several different portions of the object are to be recorded, confirmation of the order, in which the images are to be recorded, and confirmation as to whether the grid should be changed over due to a difference in image recording conditions or may not be changed over can be made at the image recording site. Therefore, the operations can be performed efficiently and without a mistake being made. Further, since the patient information, such as the ID information, can be confirmed at the image recording site, the problems can be prevented from occurring in that a patient is mistaken for another in recording data. Furthermore, with the first radiation detecting cassette in accordance with the present invention, wherein the displaying means is located on the side opposite to the side exposed to the radiation, the area of the irradiation surface can be kept wide.

With the second radiation detecting cassette in accordance with the present invention, which is provided with the operation panel for setting details of processing of the image signal, and the fourth radiation detecting cassette in accordance with the present invention, which is provided with the operation panel for setting details of processing of subsidiary information giving specifics about the image signal, the details of processing can be set on the cassette side, and it is not necessary for the operator to return to a display device for the setting of the details of processing. Therefore, the operability can be kept high, and the image recording operation can be performed efficiently.

With the second radiation detecting cassette in accordance with the present invention, which is provided with the image processing means for performing processing of the image signal, and the fourth radiation detecting cassette in accordance with the present invention, which is provided with the processing means for performing processing of the subsidiary information giving specifics about the image signal, even if a display device for an image recording system, such as a work station, is not provided, the image processing, or the like, can be performed with the radiation detecting cassette itself, and the image signal obtained from the processing can be fed into an output device, or the like, which is connected to the radiation detecting cassette. The effects are convenient.

With the second radiation detecting cassette in accordance with the present invention, further comprising the displaying means for displaying an image represented by a processed image signal, which has been obtained from the processing performed on the image signal and in accordance with details of operations performed from the operation panel, operations can be performed while the processed image is being seen, and therefore the work efficiency can be kept high.

With the third radiation detecting cassette, which is provided with the operation panel for setting details of processing concerning transfer of the image signal, and the fifth radiation detecting cassette, which is provided with the operation panel for setting details of processing concerning transfer of subsidiary information giving specifics about the image signal, the specifying of the transfer destination of the image signal and the alteration of the order, in which the image signals are to be transferred, can be performed on the cassette side, and it is not necessary for the operator to return to a display device for performing such operations. Therefore,the operability can be kept high, and the image recording operation can be performed efficiently.

With the third radiation detecting cassette in accordance with the present invention, which further comprises the transfer means for transferring the image signal to a transfer destination having been set from the operation panel, and with the fifth radiation detecting cassette in accordance with the present invention, which further comprises the transfer means for transferring the subsidiary information giving specifics about the image signal to a transfer destination having been set from the operation panel, the image signal or the subsidiary information can be transferred directly from the cassette side to the transfer destination having been set. The effects are convenient.

Also, with the second radiation detecting cassette in accordance with the present invention, which further comprises the image processing means, with the fourth radiation detecting cassette in accordance with the present invention, which further comprises the processing means for performing processing of the subsidiary information giving specifics about the image signal, and with the third and fifth radiation detecting cassettes in accordance with the present invention, which further comprise the transfer means, it is not necessary to utilize a display device, and the same operations as those with the conventional display device can be performed with the radiation detecting cassette itself. Therefore, the operability can be kept markedly high, and the radiation detecting cassette is easy to use.

The conventional radiation detecting cassette requires control with a display device even after the image recording operation, and therefore limitation has been imposed upon portability of the radiation detecting cassette. However, with the radiation detecting cassettes in accordance with the present invention, wherein the same operations as those with the conventional display device can be performed with the radiation detecting cassettes themselves, the radiation detecting cassettes are easy to carry and has a high degree of freedom. Therefore, an image can be outputted at every desired place when necessary. Thus the radiation detecting cassettes in accordance with the present invention have a high portability and are convenient.

Further, with the second, third, fourth, and fifth radiation detecting cassettes in accordance with the present invention, which further comprise the displaying means for displaying details of operations performed from the operation panel, operations can be performed while the details of setting are being confirmed. Therefore, the work efficiency can be kept high.

As described above, the displaying means, which displays the image represented by the processed image signal having been obtained from the processing performed on the image signal and in accordance with the details of operations performed from the operation panel, and the displaying means, which displays the details of operations performed from the operation panel, should preferably be located on the surface of the case housing, which surface is on the side opposite to the detection surface of the case housing. In such cases, confirmation of the details of the setting and confirmation of the recorded image can be performed while the radiation, detecting cassette is being located in the vicinity of the object. Therefore, the work efficiency can be enhanced even further. Also, the displaying means does not obstruct the detection of radiation. Further, in cases where the displaying means is located on the outer surface of the case housing, confirmation of the details of the setting and confirmation of the recorded image can be performed without the case housing being opened. Also, the solid-state radiation detector can be accommodated completely in the case housing, and the problems with regard to dust, or the like, can be prevented from occurring.

Furthermore, with the second, third, fourth, and fifth radiation detecting cassettes in accordance with the present invention, wherein the operation panel is located on the surface of the case housing, which surface is on the side opposite to the detection surface of the case housing, various operations with the operation panel can be performed while the radiation detecting cassette is being located in the vicinity of the object. Therefore, the work efficiency can be enhanced even further. Also, the operation panel does not obstruct the detection of radiation. Further, in cases where the operation panel is located on the outer surface of the case housing, the operations with the operation panel can be performed without the case housing being opened. Also, the solid-state radiation detector can be accommodated completely in the case housing, and the problems with regard to dust, or the like, can be prevented from occurring.

DESCRIPTION OF THE PREFERRED EMBODIMENTS

The present invention will hereinbelow be described in further detail with reference to the accompanying drawings.

Figure 1:
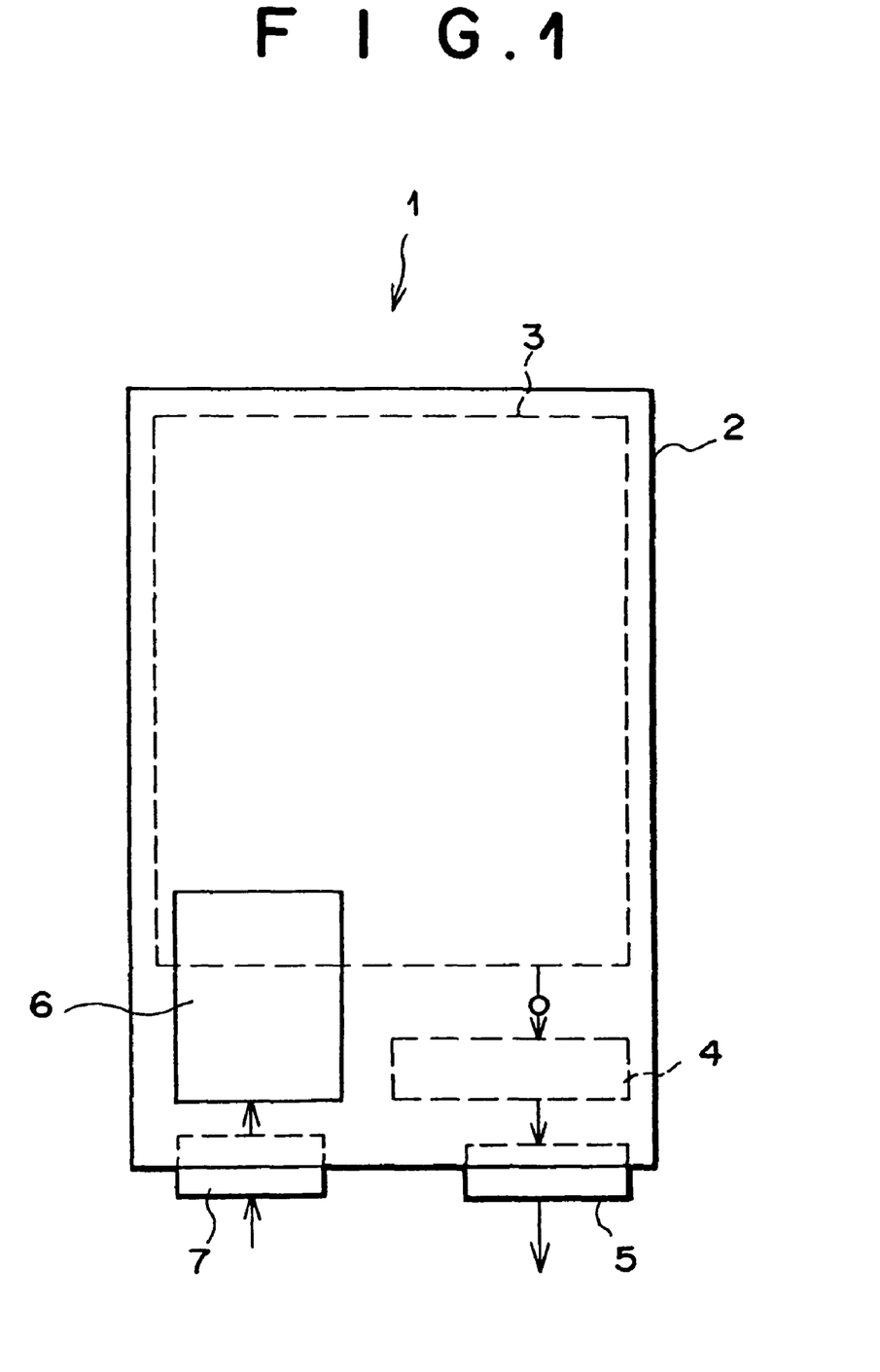
FIG. 1 is a schematic rear view showing an embodiment of the radiation detecting cassette in accordance with the present invention.

FIG. 1 is a schematic rear view showing an embodiment of the radiation detecting cassette in accordance with the present invention. With reference to FIG. 1, a radiation detecting cassette (hereinbelow referred to simply as the cassette) 1 comprises an approximately flat plate-like rectangular case housing 2, and a flat plate-like radiation detector (hereinbelow referred to simply as the detector) 3 accommodated in the case housing 2. Ordinarily, the case housing 2 also contains an electric power source (not shown), such as a battery. The detector 3 comprises a plurality of solid-state detecting devices, which are arrayed in a two-dimensional form.

Ordinarily, the solid-state detecting devices, i.e. solid-state sensors, are formed on a glass substrate. However, in this embodiment, the substrate should preferably be formed from a resin (a plastic material). This is because the cassette 1 is carried and used, and therefore it is desired that the substrate accommodated in the cassette 1 has a shock resistance so as not to break easily due to a falling accident, or the like, and that the substrate is light in weight and is easy to carry. In a process for forming the solid-state sensors on the substrate, the substrate is exposed to high temperatures and chemical agents. Therefore, the material for the substrate is required to have a resistance to high temperatures and a resistance to chemical agents. Further, in cases where the detector 3 is the photo reading type of detector proposed by the applicant in Japanese Patent Application No. 10(1998)-232824, wherein reading light is irradiated to the solid-state sensors and latent image charges having been accumulated in the solid-state sensors are thereby read as an electric signal, the substrate for the solid-state sensors is required to have permeability to light and to be capable of transmitting the reading light. Examples of the resin materials for the substrate having the resistance to high temperatures and the resistance to chemical agents include polyimides. In cases where the polyimides are subjected to heat treatment and converted into colorless materials, the polyimides can be utilized as the materials for the substrate having permeability to light.

A radiation image of an object having been detected by the detector 3 is stored as an image signal in an image memory 4. When necessary, the image memory 4 is connected by connection means 5, such as a connector, to an external device (not shown), and the image signal is read from the image memory 4 and utilized by the external device for reproducing the radiation image of the object as a visible image.

A display device (serving as the displaying means) 6, such as a liquid crystal panel, is located on the rear surface of the case housing 2. The display device 6 is provided with display processing means, such as an X-Y address circuit and a control circuit. The display device 6 displays information, which represents operations performed with an external console, or the like, and information, which is received from a connecting section (serving as the receiving means) 7 for receiving signals from a control section (not shown). In cases where the connecting section 7 is connected to a cable (not shown) for cable communication, the connecting section 7 is constituted of a terminal or a connector. In cases where the connecting section 7 receives signals sent through radio communication, the connecting section 7 is constituted of an antenna and a relevant radio receiving processing circuit (not shown).

By way of example, the display device 6 may be constituted of a liquid crystal panel. The display device 6 displays the serial number of an image recording operation, the sex of a patient, the name of the patient, the age of the patient, the portion of the object, the image of which is to be recorded, the direction, in which the image is to be recorded, the image size, the order in which the images are to be recorded (in cases where the images of a plurality of portions of the object are to be recorded), and the like. Therefore, at the image recording site, the radiation engineer can make confirmation as to whether the patient being present at the image recording site is or is not the patient, whose image is to be recorded. Also, at the image recording site, the radiation engineer can give necessary instructions to the patient. For such purposes, it is not necessary for the radiation engineer to return to the console.

The display device 6 should preferably be located on the rear surface side of the cassette 1, which surface side is not irradiated to radiation. In such cases, the display device 6 does not obstruct the detection surface of the detector 3. In cases where the display device 6 is to be located on the front surface side, the display device 6 should be located at a corner region other than the center region of the detection surface. In both the cases where the display device 6 is located on the rear surface side of the cassette 1 and the cases where the display device 6 is located on the front surface side of the cassette 1, the operator for the image recording operation can confirm the information displayed on the display screen of the display device 6 each time an image recording operation is to be performed. Information representing an image recording menu is sent from the console to the display device 6 before each image recording operation is to be performed. Alternatively, pieces of information representing a plurality of image recording menus may be sent collectively from the console to the display device 6.

The radiation detecting cassette in accordance with the present invention is not limited to the embodiment described above and may be embodied in various other ways. For example, the display device 6 may have a vertically or horizontally elongated shape such that it may not overlap upon the detector 3. Also, the display device 6 may display information representing the remaining memory capacity of the image memory 4.

Figure 2A:
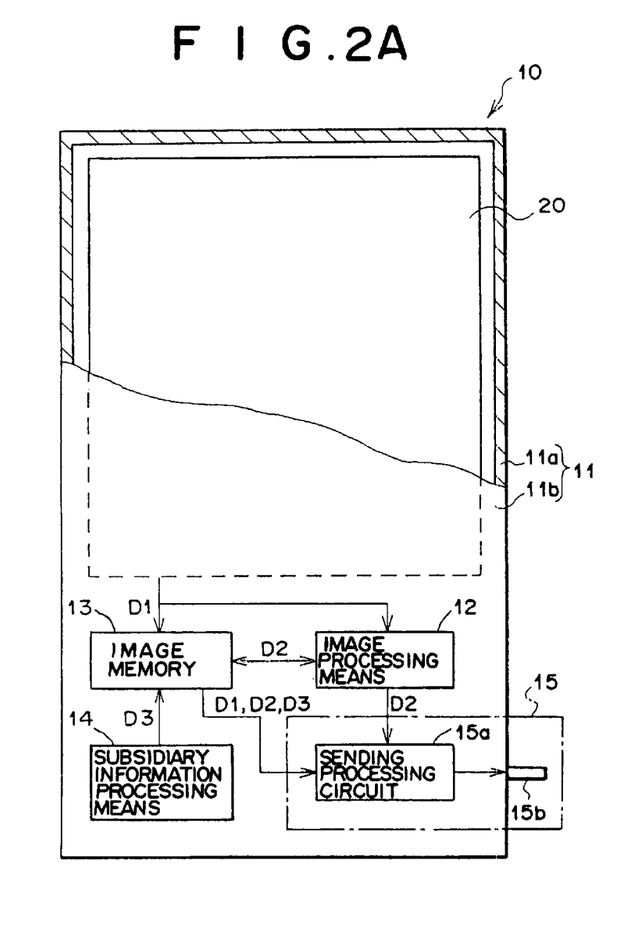
FIG. 2A is a plan view showing a detection surface side of a different embodiment of the radiation detecting cassette in accordance with the present invention.
Figure 2B:
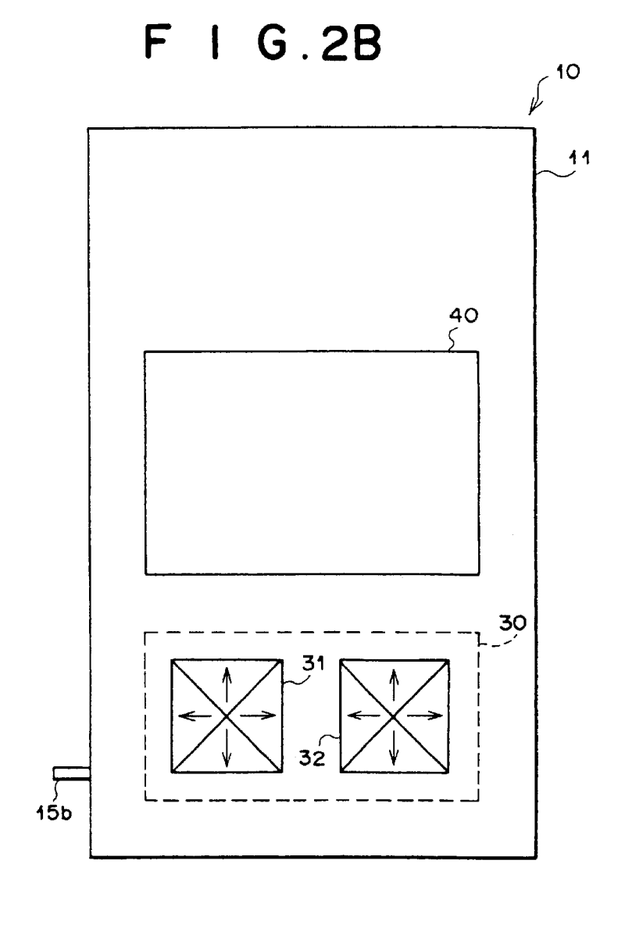
FIG. 2B is a plan view showing a surface (a rear surface) on the side opposite to the detection surface in the embodiment of FIG. 2A.

A different embodiment of the radiation detecting cassette in accordance with the present invention will be described hereinbelow. FIG. 2A is a plan view showing a detection surface side of a different embodiment of the radiation detecting cassette in accordance with the present invention (with part of a cover member being cut away). FIG. 2B is a plan view showing a surface (a rear surface) on the side opposite to the detection surface in the embodiment of FIG. 2A.

As illustrated in FIG. 2A, a radiation detecting cassette (hereinbelow referred to simply as the cassette) 10 comprises a solid-state radiation detector (hereinbelow referred to simply as the detector) 20, and a case housing 11, which has an approximately rectangular parallelepiped shape and which accommodates the detector 20. The cassette 10 also comprises image processing means 12, which is connected to the detector 20 and which performs predetermined image processing on an image signal D1 having been read (fed out) from the detector 20. The cassette 10 further comprises an image memory 13 for storing the image signal D1, which has been read from the detector 20, or an image signal D2, which has been obtained from the image processing performed by the image processing means 12. The cassette 10 still further comprises subsidiary information processing means 14 for performing processing of subsidiary information D3 giving specifics about the image signal D1 and the image signal D2. The cassette 10 also comprises transfer means 15, which is connected to the image processing means 12 and the image memory 13 and which feeds out the image signal D1 and the image signal D2 to an external display device or transfers them through a network, or the like, to a clinical room, or the like. Though not shown, the cassette 10 is provided with an electric power source, such as a battery, for driving the detector 20, the image processing means 12, and the like.

As the image memory 13, an image memory having a storage capacity corresponding to a plurality of images is employed. When each image recording operation is performed, an image signal is fed out from the detector 20 and is converted by an analog-to-digital converter (not shown) into a digital image signal D1. The digital image signal D1 is stored at a predetermined address region in the image memory 13.

The transfer means 15 is of the radio communication type. The transfer means 15 comprises a sending processing circuit 15a, which converts various signals into radio signals, and an antenna 15b.

Figure 3:
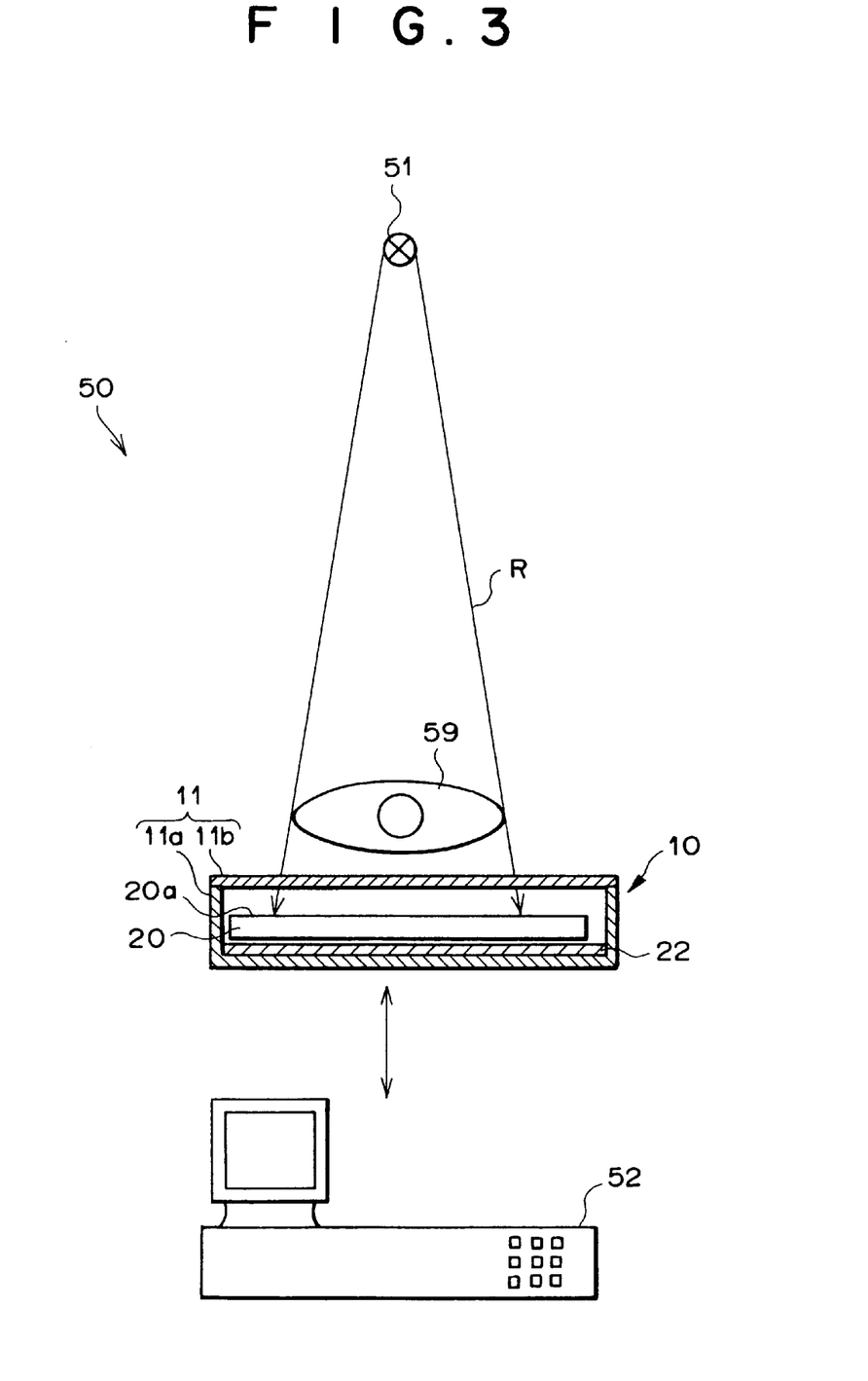
FIG. 3 is a schematic view showing a radiation image recording and read-out apparatus, in which the embodiment of FIG. 2A is employed.

The case housing 11 comprises a box-shaped accommodating section 11a, which is open at its top, and a cover member 11b, which cover the open top of the accommodating section 11a. In order to enable exchange of the detector 20 accommodated in the case housing 11, and the like, the cover member 11b is constituted such that it can be released from the accommodating section 11a. The cover member 11b also serves as a grid. As illustrated in FIG. 3, a radiation absorbing member 22, which may be formed from lead, or the like, is located on the bottom surface of the accommodating section 11a. The radiation absorbing member 22 prevents the radiation having passed through the detector 20 from adversely affecting the members located on the rear surface of the case housing 11, such as an operation panel 30 and a liquid crystal panel 40, which will be described later. The radiation absorbing member 22 is also utilized for the prevention of back scattered radiation.

As illustrated in FIG. 2B, the operation panel 30 and the liquid crystal panel 40, which serves as the displaying means, are located on the rear (outer) surface of the case housing 11. The operation panel 30 is provided with cursor keys 31 and 32, each of which can move a cursor in upward, downward, rightward, and leftward directions. The cursor key 31 is utilized to set a technique for the image processing, which is to be performed on the image signal D1, parameters for the image processing, and details of processing of the subsidiary information D3. The cursor key 32 is utilized to set details of processing concerning transfer of the image signals D1, D2, and the subsidiary information D3. Alternatively, only one cursor key, which can act as the cursor keys 31 and 32, may be provided. As another alternative, the operation panel 30 may be provided with key input types of pushbuttons in lieu of the cursor type.

The liquid crystal panel 40 displays the details of key operations performed on the operation panel 30 and the image, which is represented by the image signal D2 having been obtained from the processing performed in accordance with the details of the key operations performed on the operation panel. The liquid crystal panel 40 is connected to display processing means (not shown) for forming a signal for the displaying.

In order for the details of key operations on the operation panel 30 to be displayed on the liquid crystal panel 40, operations with a mouse device of a personal computer, or the like, and the accompanying cursor display techniques (e.g., techniques for inversion display of setting candidates, and the like) may be utilized.

How the cassette 10 operates will be described hereinbelow by taking chest image recording as an example. FIG. 3 is a schematic view showing a radiation image recording and read-out apparatus, in which the cassette 10 is employed, and an object.

With reference to FIG. 3, a radiation image recording and read-out apparatus 50 comprises the cassette 10, a radiation source 51, and a display device 52 for controlling an image recording operation. The display device 52 is connected through a network to a clinical room (not shown). Radiation R is produced by the radiation source 51 and passes through an object 59. The cassette 10 is located such that the radiation R carrying image information of the object 59 may impinge upon a detection surface 20a of the detector 20. The cassette 10 is associated with the display device 52 through radio communication. At the time of the image recording operation, various control signals are sent from the display device 52 to the cassette 10.

When an instruction for making preparations for the image recording operation is given from the display device 52, candidates for image recording menus, which concern image recording conditions, and the like, (one form of the details of key operations) are displayed on the liquid crystal panel 40 of the cassette 10. A desired image recording menu is selected from the image recording menus, which are displayed on the liquid crystal panel 40, by operating the cursor key 31 of the operation panel 30. When the desired image recording menu is selected, an image processing method and processing parameters, which have been registered with respect to the image recording menu, are set in the image processing means 12. In cases where an image processing method and processing parameters different from those having been registered are to be set, the setting is altered by operating the cursor key 31.

After the image processing method, and the like, have been set, the radiation is produced by the radiation source 51, and the image recording operation is performed under predetermined image recording conditions. The image signal D1 having been obtained from the image recording operation is stored in the image memory 13. Alternatively, the image signal D2, which has been obtained from the image processing performed by the image processing means 12 on the image signal D1 having been read from the detector 20, may be stored in the image memory 13. In such cases, the subsidiary information processing means 14 forms signals, which represent the image processing method and the parameters having been set. The thus formed signals are stored as the subsidiary information D3 for the image signal D2 in the image memory 13 together with the image signal D2.

The setting of the image processing method, and the like, the image recording operation, and the storing of the image signal D1, or the like, in the image memory 13, which are described above, are iterated successively (i.e., the image recording operations are performed successively) with respect to the recording of chest images from different directions in accordance with the image recording menu. In this manner, the image signals D1, which represent the chest images recorded from six different directions, and the like, are stored in the image memory 13.

After a series of the image recording operations have been performed, each of the image signals is read from the image memory 13 and converted by the display processing means (not shown) into the signal for the displaying. A visible image is reproduced from the signal and displayed on the liquid crystal panel 40. The thus obtained visible images are successively displayed forwardly or backwardly by operating the cursor key 31 of the operation panel 30, and confirmation is made as to whether the images were or were not recorded accurately. At this time, histograms of the images may be formed and displayed. In such cases, it can be confirmed whether the EDR processing has or has not been performed accurately.

After the confirmation of the images has been performed, a list of devices, to which the image signals can be transferred, is displayed on the liquid crystal panel 40. With respect to each image, the transfer destination and the order of image signal transfer are specified with the cursor key 32 of the operation panel 30. For example, the transfer destination and the order of image signal transfer may be specified such that an image signal representing a frontal object image and an image signal representing a lateral object image may be transferred in this order into a printer (not shown), which is connected to the predetermined display device 52, and such that the frontal object image and the lateral object image may be reproduced. Alternatively, the transfer destination and the order of image signal transfer may be specified such that the image signals may be transferred through a network to a clinical room.

In cases where the image signal D2 having been obtained from the image processing is stored in the image memory 13, the image signal D2 (and the subsidiary information D3, when necessary) can be transferred to the printer, and the image represented by the image signal D2 can be outputted immediately. Also, the radiation image of the object 59 can be reproduced immediately in the clinical room and utilized in making a diagnosis. In cases where the image signal D1 before being subjected to the image processing is stored in the image memory 13, the image signal D1 may be transferred to the display device 52 and subjected to the image processing, which is performed by an image processing section (not shown) located in the display device 52. Thereafter, a visible image represented by the image signal having been obtained from the image processing may be outputted by the printer, or the image signal having been obtained from the image processing may be transferred to the clinical room.

In the embodiment described above, after a series of image recording operations have been performed, the cassette 10 is kept in the state associated with the display device 52 through radio communication. Alternatively, since the cassette 10 is provided with the image processing means 12, the subsidiary information processing means 14, and the transfer means 15, after the image recording operations have been performed, the cassette 10 may be released from the display device 52, and the image confirmation and the transfer processing described above can be performed with the cassette 10 alone. For example, in cases where the image signal D1 before being subjected to the image processing is stored in the image memory 13, the corresponding subsidiary information D3 may be stored in the image memory 13 together with the image signal D1. The image signal D1 may then be read from the image memory 13 together with the corresponding subsidiary information D3, and the image processing may be performed by the image processing means 12 on the image signal D1 and in accordance with the image processing method and the processing parameters, which are represented by the subsidiary information D3. Thereafter, the image signal having been obtained from the image processing may be transferred by the transfer means 15 to the clinical room, or the like. In cases where the image signal D2 having been obtained from the image processing is stored in the image memory 13, the image signal D2 having been read from the image memory 13 can be immediately transferred by the transfer means 15 to the clinical room, or the like. Alternatively, the subsidiary information D3 may be transferred to the transfer destination together with the image signal D1 before being subjected to the image processing or the image signal D2 having been obtained from the image processing, and various kinds of processings may be performed at the transfer destination and in accordance with the subsidiary information D3.

The radiation detecting cassette in accordance with the present invention is not limited to the embodiment of FIGS. 2A and 2B described above and may be embodied in various other ways. For example, the radiation detecting cassette in accordance with the present invention may be provided with the operation panel 30 and the liquid crystal panel 40, and may not be provided with the image processing means 12 and the transfer means 15. In such cases, the processing may be performed by the display device 52 and in accordance with the image processing method, the processing parameters, the transfer destination, and the like, which have been set in the radiation detecting cassette.

Also, in the embodiment of FIGS. 2A and 2B, the operation panel 30 and the liquid crystal panel 40 are located on the outer surface on the rear side of the case housing 11. Alternatively, the operation panel 30, or the like, may be located within the case housing 11. In such cases, the accommodating section 11a and the cover member 11b may be engaged with each other by a hinge, or the like, such that the cover member 11b can be opened and closed. The operation panel 30 and the liquid crystal panel 40 may be located on the inner surface of the cover member 11b, such that the operations with the operation panel 30 and confirmation with the liquid crystal panel 40 can be performed by opening the cover member 11b.

What is claimed is:

1. A radiation detecting cassette, comprising:
   i) a radiation detector provided with a plurality of solid-state detecting devices, which are arrayed in a two-dimensional form and which detect radiation carrying image information of an object and convert the radiation into an image signal representing a radiation image of the object, and
   ii) a flat-shaped case housing for accommodating the radiation detector,
   wherein the improvement comprises the provision of:
      receiving means for receiving necessary information from the exterior in cases where an image recording operation is to be performed, and
      displaying means for displaying the information having been received by said receiving means.

2. A radiation detecting cassette as defined in claim 1 wherein said displaying means is located on a surface of the case housing, which surface is on the side opposite to the surface exposed to radiation.

3. A radiation detecting cassette, comprising:
   i) a solid-state radiation detector for detecting radiation, which carries image information, and feeding out an image signal representing a radiation image, and
   ii) a case housing for accommodating the solid-state radiation detector,
   wherein the improvement comprises the provision of an operation panel for setting details of processing of the image signal.

4. A radiation detecting cassette as defined in claim 3 further comprising image processing means for performing the processing of the image signal.

5. A radiation detecting cassette as defined in claim 4 further comprising displaying means for displaying an image represented by a processed image signal, which has been obtained from the processing performed on the image signal and in accordance with details of operations performed from said operation panel.

6. A radiation detecting cassette as defined in claim 3 further comprising displaying means for displaying an image represented by a processed image signal, which has been obtained from the processing performed on the image signal and in accordance with details of operations performed from said operation panel.

7. A radiation detecting cassette, comprising:
   i) a solid-state radiation detector for detecting radiation, which carries image information, and feeding out an image signal representing a radiation image, and
   ii) a case housing for accommodating the solid-state radiation detector,
   wherein the improvement comprises the provision of an operation panel for setting details of processing concerning transfer of the image signal.

8. A radiation detecting cassette as defined in claim 7 further comprising transfer means for transferring the image signal to a transfer destination, which has been set from said operation panel.

9. A radiation detecting cassette, comprising:
   i) a solid-state radiation detector for detecting radiation, which carries image information, and feeding out an image signal representing a radiation image, and
   ii) a case housing for accommodating the solid-state radiation detector,
   wherein the improvement comprises the provision of an operation panel for setting details of processing of subsidiary information giving specifics about the image signal.

10. A radiation detecting cassette as defined in claim 9 further comprising processing means for performing processing of the subsidiary information giving specifics about the image signal.

11. A radiation detecting cassette, comprising:
   i) a solid-state radiation detector for detecting radiation, which carries image information, and feeding out an image signal representing a radiation image, and ii) a case housing for accommodating the solid-state radiation detector, wherein the improvement comprises the provision of an operation panel for setting details of processing concerning transfer of subsidiary information giving specifics about the image signal.

12. A radiation detecting cassette as defined in claim 11 further comprising transfer means for transferring the subsidiary information giving specifics about the image signal to a transfer destination, which has been set from said operation panel.

13. A radiation detecting cassette as defined in any of claims 3 to 12 further comprising displaying means for displaying details of operations performed from said operation panel.

14. A radiation detecting cassette as defined in claim 13 wherein said displaying means for displaying details of operations performed from said operation panel is located on a surface of the case housing, which surface is on the side opposite to a detection surface of the case housing.

15. A radiation detecting cassette as defined in claim 13 wherein said displaying means for displaying details of operations performed from said operation panel is located on an outer surface of the case housing.

16. A radiation detecting cassette as defined in any of claims 3 to 12 wherein said operation panel is located on a surface of the case housing, which surface is on the side opposite to a detection surface of the case housing.

17. A radiation detecting cassette as defined in any of claims 3 to 12 wherein said operation panel is located on an outer surface of the case housing.

18. A radiation detecting cassette as defined in claim 6 or 5 wherein said displaying means is located on a surface of the case housing, which surface is on the side opposite to a detection surface of the case housing.

19. A radiation detecting cassette as defined in claim 6 or 5 wherein said displaying means is located on an outer surface of the case housing.

* * * * *